(12) United States Patent
Humphreys et al.

(10) Patent No.: US 10,406,674 B2
(45) Date of Patent: Sep. 10, 2019

(54) REMOVABLE/RE-USABLE BRACKET

(71) Applicants: Tyler Humphreys, Eugene, OR (US); Ken Humphreys, Henderson, NV (US); Edward Haase, Henderson, NV (US); Nicholas Charles Berry, Las Vegas, NV (US); Jeremy Burkhardt, Las Vegas, NV (US)

(72) Inventors: Tyler Humphreys, Eugene, OR (US); Ken Humphreys, Henderson, NV (US); Edward Haase, Henderson, NV (US); Nicholas Charles Berry, Las Vegas, NV (US); Jeremy Burkhardt, Las Vegas, NV (US)

(73) Assignee: Origin Acoustics, Corona, CA (US)

( * ) Notice: Subject to any disclaimer, the term of this patent is extended or adjusted under 35 U.S.C. 154(b) by 0 days.

(21) Appl. No.: 15/673,240

(22) PCT Filed: Oct. 21, 2016

(86) PCT No.: PCT/US2016/058298
§ 371 (c)(1),
(2) Date: Aug. 9, 2017

(87) PCT Pub. No.: WO2018/034685
PCT Pub. Date: Feb. 22, 2018

(65) Prior Publication Data
US 2019/0160649 A1 May 30, 2019

Related U.S. Application Data

(60) Provisional application No. 62/375,573, filed on Aug. 16, 2016.

(51) Int. Cl.
*H04R 1/02* (2006.01)
*B25H 7/00* (2006.01)
(Continued)

(52) U.S. Cl.
CPC .............. *B25H 7/045* (2013.01); *F21S 8/026* (2013.01); *F21V 21/04* (2013.01);
(Continued)

(58) Field of Classification Search
CPC ........ B25H 7/045; B25H 1/0078; B25H 7/00; B23B 51/0406; B23D 59/00; F21S 8/02;
(Continued)

(56) References Cited

U.S. PATENT DOCUMENTS 2,064,696 A 12/1936 Smith et al.
4,338,724 A 7/1982 Johnson
(Continued)

*Primary Examiner* — Tan Le
(74) *Attorney, Agent, or Firm* — Kirk A. Buhler; Buhler & Associates Patenting

(57) ABSTRACT

Improvements in a reusable locating bracket for a recessed speaker or light bracket is disclosed. The bracket matches the hole diameter for a speaker of light. The bracket is installed prior to installation of drywall and is used as a trim guide. After installation of the drywall and cutting or trimming of the opening, the bracket is folded, bent, rotated or articulated where it can be removable through the trimmed opening in the drywall or sheet rock. The bracket has folding hinges for retaining side supports. The side supports are typically strips of cardboard, chip board or other material that provides a span from the bracket to studs, joists or beams. The folding hinges have teeth that grip the cardboard and can be opened to pull the cardboard through the retainer.

19 Claims, 4 Drawing Sheets

(51) Int. Cl.
 *F21V 21/04* (2006.01)
 *F21S 8/02* (2006.01)
 *B25H 7/04* (2006.01)
 *B23B 51/04* (2006.01)
 *B23D 59/00* (2006.01)

(52) U.S. Cl.
 CPC .......... *B23B 51/0406* (2013.01); *B23D 59/00* (2013.01); *F21S 8/02* (2013.01); *H04R 1/025* (2013.01)

(58) Field of Classification Search
 CPC ......... H04R 1/025; H04R 1/026; E04B 9/006; F21V 21/04; F21V 21/047
 See application file for complete search history.

(56) References Cited

U.S. PATENT DOCUMENTS

| | | | |
|---|---|---|---|
| 4,778,134 A | 10/1988 | Struthers et al. | |
| 5,221,069 A | 6/1993 | Struthers et al. | |
| 5,960,423 A * | 9/1999 | Chaudhuri | G06F 16/22 707/715 |
| D480,745 S | 10/2003 | Aguilar et al. | |
| 6,758,451 B2 | 7/2004 | Rivera et al. | |
| 7,005,020 B2 | 2/2006 | McCain | |
| 7,497,025 B2 | 3/2009 | Murray | |
| 7,665,700 B2 * | 2/2010 | Taba | F16M 13/02 248/231.9 |
| D702,569 S | 4/2014 | Moore et al. | |
| 9,255,409 B2 * | 2/2016 | Moore | E04H 12/22 |
| 2006/0231326 A1 * | 10/2006 | Iwayama | H04R 1/025 181/150 |
| 2006/0261235 A1 * | 11/2006 | Rippel | F21V 21/04 248/343 |
| 2007/0290112 A1 | 12/2007 | Orth et al. | |
| 2009/0095861 A1 * | 4/2009 | Taba | F16M 13/02 248/231.9 |
| 2009/0231861 A1 * | 9/2009 | Wedekind | F21V 21/048 362/365 |

\* cited by examiner

REMOVABLE/RE-USABLE BRACKET

CROSS REFERENCE TO RELATED APPLICATIONS

This application claims priority to International PCT application PCT/US2016/058298 filed on Oct. 21, 2016 which claims the benefit of Provisional 62/375,573 filed Aug. 16, 2016 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in an installation bracket. More particularly, the present removable/re-usable bracket for speaker or lighting installation allows an installer to set a location for a speaker or lighting, trim the hole, articulate the bracket and remove the bracket through the trimmed hole.

Description of Related Art Including Information Disclosed Under 37 CFR 1.97 and 1.98

When speakers or lights are installed in a home or business, the holes must be cut through the wall or ceiling. In new construction, a template is often installed on the studs during construction and when the drywall or sheet rock is being installed the template is used to trim the opening. Presently the template is permanently installed on the studs, and once the drywall is installed over the template the template becomes a permanent part of the structure. Because the template is rigid it can only be destructively removed, and because the template is larger than the opening in the drywall, destruction of the drywall is required to pass the template through the opening.

A number of patents and or publications have been made to address these issues. Exemplary examples of patents and or publication that try to address this/these problem(s) are identified and discussed below.

U.S. Pat. No. 6,364,511 issued on Apr. 2, 2002 to Steve Cohen entitled a Universal Adapter Bracket and Ornamental Trim Assembly Using Same for in-Ceiling Recessed light Fixtures. The adapter bracket retains a trim assembly and attaches to either a light baffle or trim ring and allows an existing light fixture to be updates by installation of a new trim assembly. While this is a template for a hole in a ceiling and is removable, it does not allow for trimming a hole through a drywall ceiling or wall.

U.S. Pat. No. D480,745 issued on Oct. 14, 2003 to Tony Aguilae et al., entitled a Light Box with Positioning Template and Portions Thereof. The template allows for the marking or trimming of the desired hole or holes. While this provides a marking for the hole, the template is static and is removed prior to the cutting of the hole(s).

U.S. Pat. No. 7,005,020 issued on Feb. 28, 2006 to Kyle McCain entitled a Process for Fabricating of a speaker Enclosure. The process involves using one or more templates to determine where the holes are placed in the enclosure. While this patent discloses the use of templates, the templates are not articulated to pass through a hole.

U.S. Pat. No. D702,569 issued on Apr. 15, 2014 entitled a Concrete Form Bolt Template and U.S. Pat. No. 9,255,409 issued on Feb. 9, 2016 discloses a Pole Base Bolt Template, both to David Moore et al. The template is assembled from four essentially equivalent parts and locates bolt holes and rebar. The template is then case into the cement base where it becomes a permanent part of the foundation. While this provides a template for holes and locations the template is a permanent part of the foundation and is not removable.

What is needed is a hole template for locating speakers or lighting and once the hole has been cut, the template can be articulated and removed through the trimmed hole for use in another location. The proposed removable/re-usable bracket for speaker, light or other installations provides the solution without the need to leave the template in the ceiling or wall.

BRIEF SUMMARY OF THE INVENTION

It is an object of the removable/re-usable bracket for the bracket to be installed prior to installation of drywall or sheetrock on walls and/or ceilings of a building or house. When a house or building is framed, the optimal location for speakers or lighting is identified. The speakers or lighting can further be located adjacent or between studs or joists or beams to provide structural support to the speaker or lighting.

It is an object of the removable/re-usable bracket for the bracket to be used to locate and trim a hole for speaker or lighting installation. A typical installer can use a hole saw, electric saw or spiral saw. These saws can use the edges of the bracket to ensure that the hole is the proper location, size and roundness.

It is another object of the removable/re-usable bracket to be round in configuration to match the diameter of the speaker or lighting that will be installed in the opening. While a round speaker or lighting may be used, it is also contemplated that the speaker or lighting can be square or rectangular in shape.

It is another object of the removable/re-usable bracket to have folding hinges for retaining side supports. The side supports are typically strips of cardboard, chip board or other material that provides a span from the bracket to studs, joists or beams. The folding hinges have teeth that grip the cardboard and can be opened to pull the cardboard through the retainer.

It is still another object of the removable/re-usable bracket for the bracket to be removable through the trimmed opening in the drywall or sheet rock. The hinge allows the bracket to be bent or folded for removal through the crated opening in the wall or ceiling. While a hinge is indicated, the bracket can be articulated in other methods such as sliding sides or accordion sides to reduce the outside diameter to allow the bracket to pass through the opening.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWING(S)

FIG. 3A shows a detail view of the support strip in the removable/re-usable bracket with the hinged door closed.

DETAILED DESCRIPTION OF THE INVENTION

Figure 1:
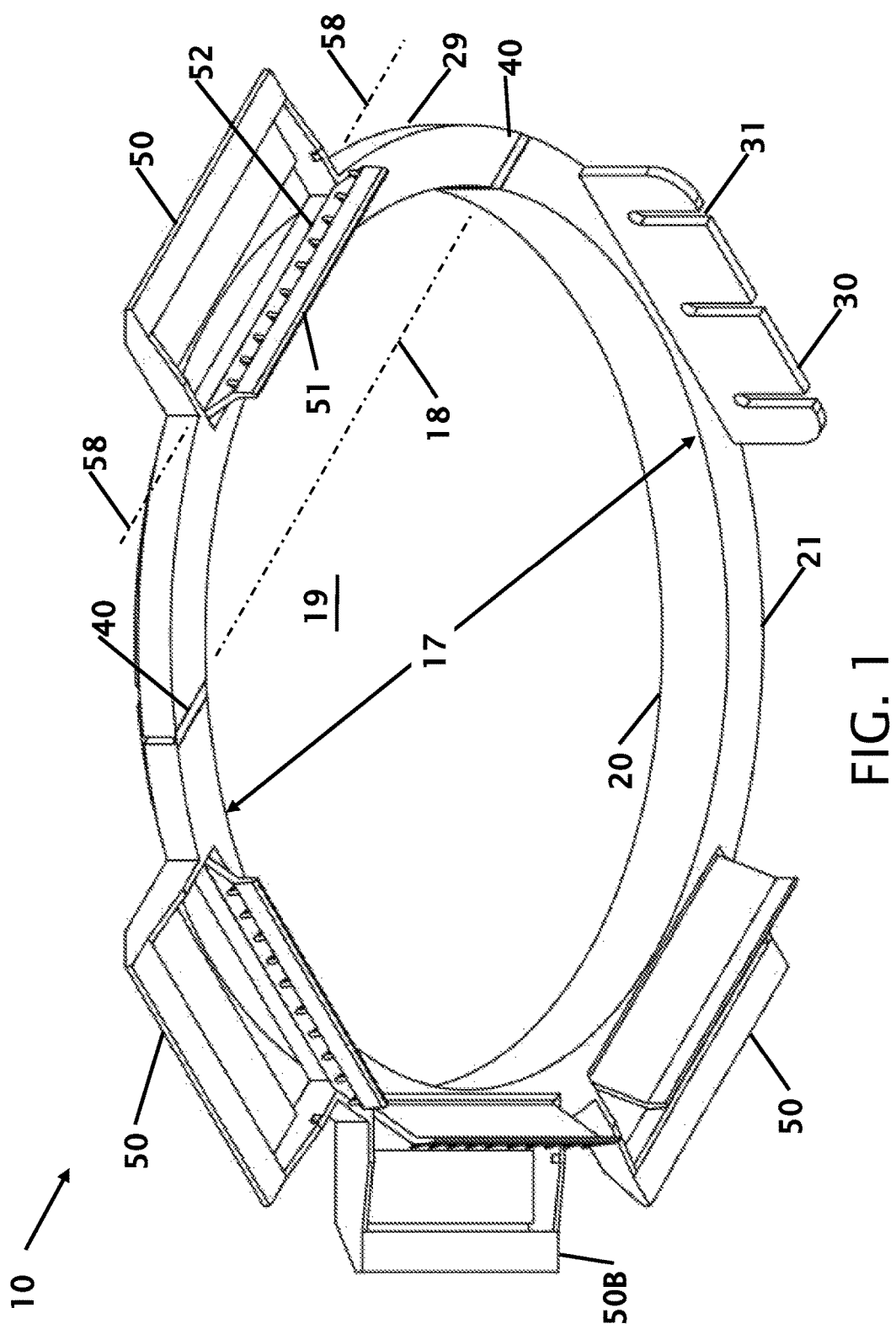
FIG. 1 shows a perspective view of a removable/re-usable bracket.

FIG. 1 shows a perspective view of a removable/re-usable bracket 10 for speaker or lighting installation. This is an underside view where the bottom surface 20 of the removable/re-usable bracket 10 would be placed against the studs, joist or rafter. The removable/re-usable bracket 10 has an open central area 19 has a diameter 17 that corresponds to the diameter 17 of the future installed speaker or lighting. While a round hole with a diameter is shown and disclosed, the opening can be square or rectangular. At least one location on the rim of the flat surface 21 is a perpendicular rib or surface 30. This surface is configured with a plurality of slots 31 for securing one or more screws to secure the removable/re-usable bracket 10 to a stud, joist or rafter. While there is shown only one surface 30 shown, it is contemplated that more than one of these surfaces can be incorporated. After trimming the drywall, securing screws can be loosened or remover to allow for removal of the removable/re-usable bracket 10. The removable/re-usable bracket 10 has a flexing axis 18 where the removable/re-usable bracket 10 can be bent along 40 the flex, hinge or bending axis 18 to reduce the horizontal profile of the removable/re-usable bracket 10. Bending the parts essentially allows section 29 to be bent from section 21. The frame members 21 and 29 form two arc sectors.

It is contemplated that the entire removable/re-usable bracket 10 can be fabricated from a single molded piece of plastic. In a typical installation in a house or building the multiple holes are required. A single removable/re-usable bracket 10 can be installed, used, removed and then used in other locations. This eliminates the need to purchase a trim frame for each speaker or lighting installation and leaving the trim frame inside of a wall or ceiling.

This figure shows a plurality of extensions 50. Specifically, there are four extensions 50, 50A, 50B and 50C are placed to provide linear, perpendicular and angular relationships to the removable/re-usable bracket 10. While there are four extension 50 that are shown, it is contemplated that less than four can be used with the design or more than four can be incorporated. Each of these extensions 50 have a hinged door 51 for securing a support member or side support (not shown in this figure). Side supports are typically strips of cardboard, chip board or other material that provides a span from the bracket to studs, joists or beams. The folding hinges or hinged doors 51 have teeth 52 that grip the cardboard and can be opened to pull the cardboard through the retainer. Each folding hinges or hinged doors 51 has a hinge axis 58.

Figure 2:
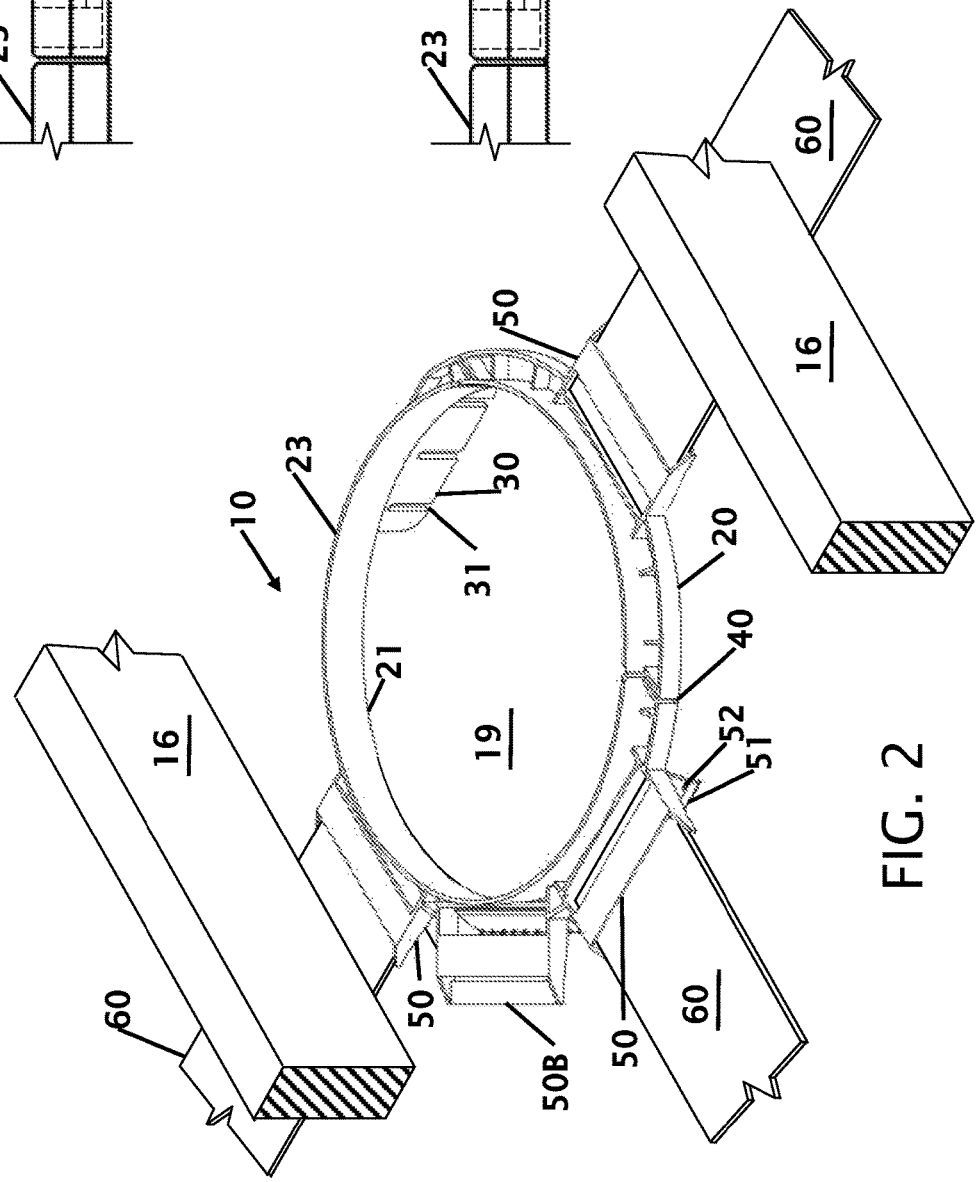
FIG. 2 shows a perspective view with support strips installed.

FIG. 2 shows a perspective view with support strips installed. When the removable/re-usable bracket 10 is installed, one or more sets of expendable support members, 60, 60A and 60C shown in this figure. The support members span from the removable/re-usable bracket 10 to studs, joists or rafters 16 that can be placed at typically 12, 16, 18 or 24 inches on center. The support members are nailed, stapled or otherwise secured to the studs, joists or rafters 16. At least one location on the rim of the flat surface 21 is a perpendicular rib or surface 30. This surface is configured with a plurality of slots 31 for securing one or more screws to secure the removable/re-usable bracket 10 to a stud, joist or rafter. The hinge doors that secure the support members are shown and described in more detail in FIGS. 3A and 3B.

Figure 3A:
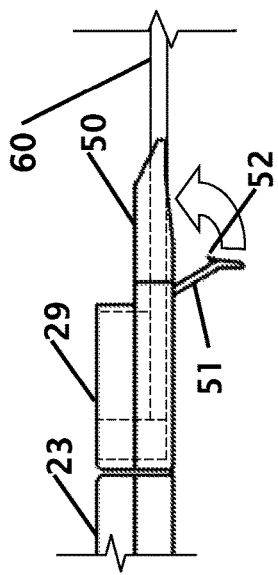
FIG. 3A shows a detail view of the support strip in the removable/re-usable bracket with the hinged door open.
Figure 3B:
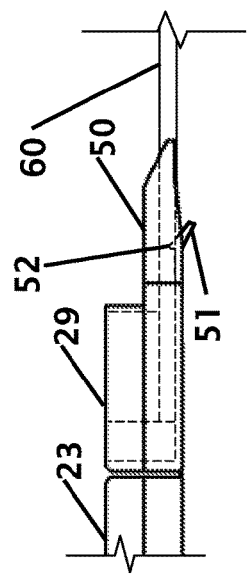

FIG. 3A shows a detail view of the support strip in the removable/re-usable bracket with the hinged door open and FIG. 3A shows a detail view of the support strip in the removable/re-usable bracket with the hinged door closed. These figures show an extension 50 extending from the hinge portion 29 of the frame. Specifically, there are four extensions 50, 50A, 50B and 50C are placed to provide linear, perpendicular and angular relationships to the removable/re-usable bracket 10. Side supports 60 are typically strips of cardboard, chip board, cardboard, plastic or other material that provides a span from the bracket to studs, joists or beams. The folding hinges or hinged doors 51 have teeth 52 that grip the cardboard and can be opened to pull the cardboard through the retainer. Each folding hinges or hinged doors 51. After the drywall is installed over the removable/re-usable bracket 10, the opening is created through the drywall, the hinged door(s) 51 are opened and the extension(s) 50 can be pulled through the opening. This frees the removable/re-usable bracket 10 from the extensions. If screws are placed through the slots 31 (as shown in other figures) the screws can be removed to free the removable/re-usable bracket 10.

Figure 4:
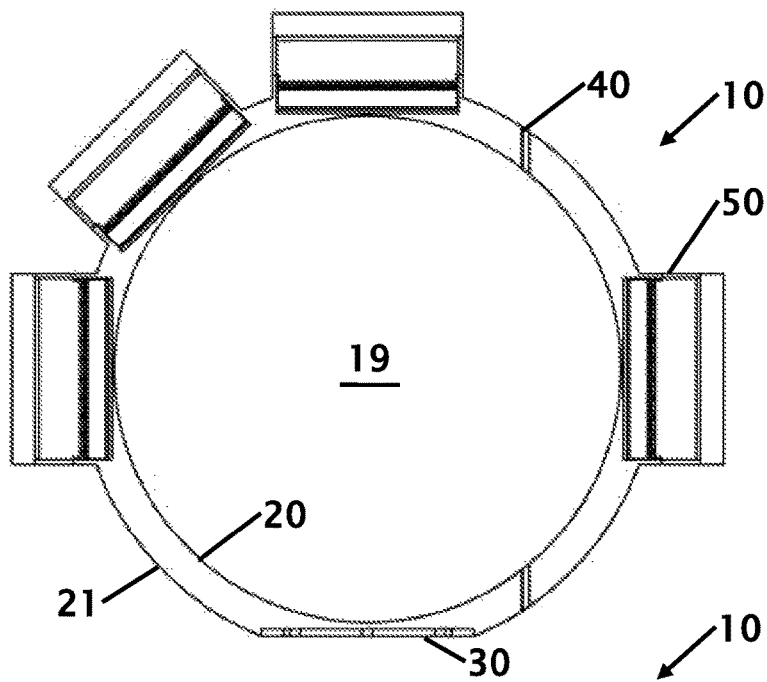
FIG. 4 shows a top view of the removable/re-usable bracket.
Figure 5:
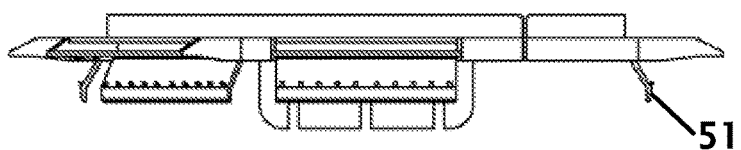
FIG. 5 shows a side view of the removable/re-usable bracket.
Figure 6:
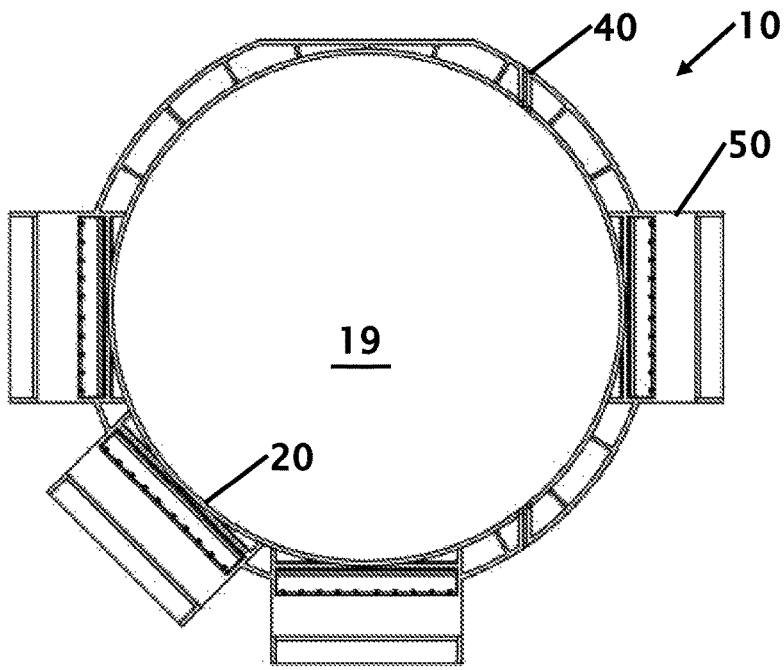
FIG. 6 shows a bottom view of the removable/re-usable bracket.

FIG. 4 shows a top view of the removable/re-usable bracket 10, FIG. 5 shows a side view of the removable/re-usable bracket 10 and FIG. 6 shows a bottom view of the removable/re-usable bracket 10.

Figure 7:
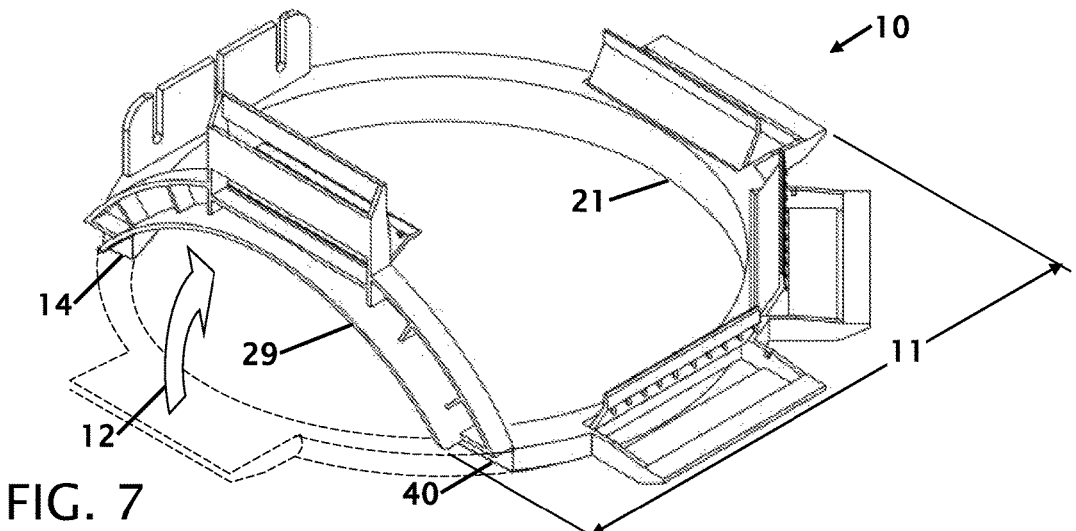
FIG. 7 shows the removable/re-usable bracket with the removable/re-usable bracket.

FIG. 7 shows the removable/re-usable bracket 10 with the bracket folded. This figure shows that the width 11 of the removable/re-usable bracket 10 has been reduced to pass the removable/re-usable bracket 10 through the cut hole. Hinges 40 allows the bending portion 29 to be articulated from the main frame housing 21. While a single hinge 40 is indicated, the bracket 10 can be articulated in other methods such as more than one hinge, dis-assembly, sliding sides or accordion sides to reduce the outside diameter to allow the bracket to pass through the opening.

Figure 8:
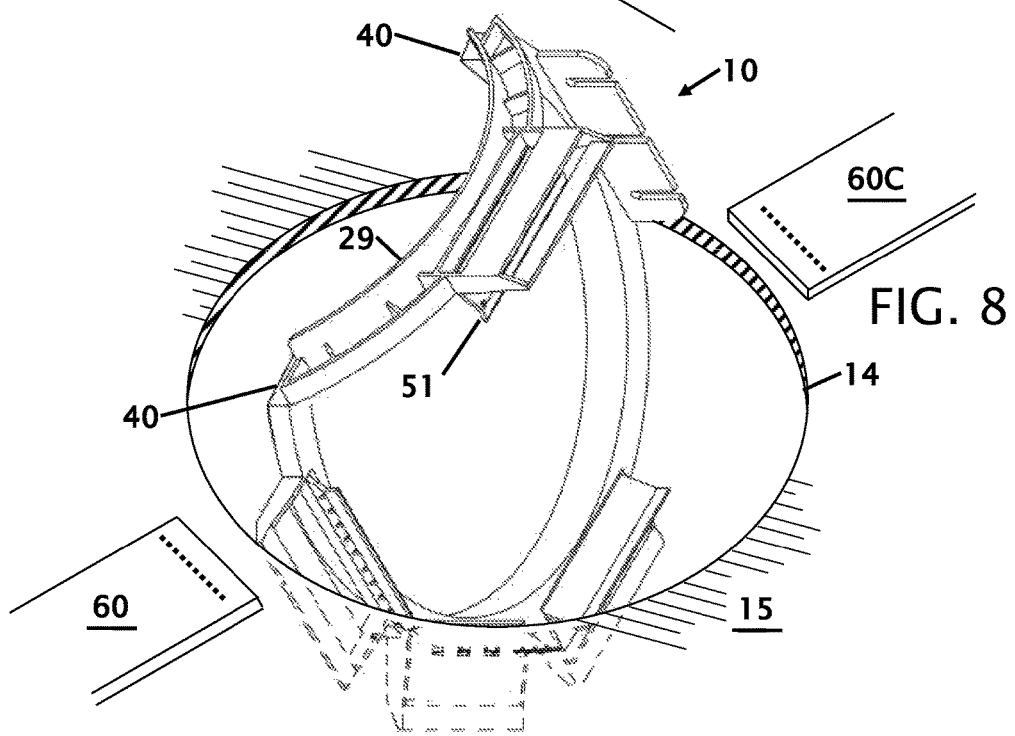
FIG. 8 shows the removable/re-usable bracket being withdrawn through a hole in a wall.

FIG. 8 shows the removable/re-usable bracket being withdrawn through a hole 14 in a wall 15. Once the hole 14 has been cut in the wall or ceiling the wall or ceiling material is removed. The hinged doors 51 are opening and the side supports 60 and 60C are released. The teeth of the hinged doors may leave an impression in the side supports. The removable/re-usable bracket 10 can then be articulated, disassembled, folded or bent to fit through the opening 14.

In other contemplated embodiments, the removable/re-usable bracket is not necessarily just a folding bracket, and can have parts that allow for the bracket to be made small enough or deformable enough to fit back through the hole. In addition, to the folding, the removable/re-usable bracket can be made like a sponge to be squished, a pad lock or with a part that slides out of the way (rotationally or pop up), or a like that can be snapped and un-snapped in sections to be removed.

Thus, specific embodiments of a removable/re-usable bracket have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A removable/re-usable bracket comprising:
a frame having a flat surface;
said frame forming a circular ring having an open central area with a first diameter;
said frame having at least two sections;
said at least two sections being articulatable to reduce said frame to a dimension less than said first diameter;
at least two extensions that are perpendicular to said flat surface on said open central area, each of said at least two extensions having a hinged door that hinges from their respective extension;
each hinged door having a plurality of teeth that are configured to temporal grip at least one side support that is/are placed therein, and
each of said hinged doors are opened to release said at least one side support from said frame for removal of said frame from said at least one side support.

2. The removable/re-usable bracket according to claim 1, wherein said at least two sections are arc sectors.

3. The removable/re-usable bracket according to claim 1, wherein said articulation is from dis-assembly, sliding sides or accordion sides.

4. The removable/re-usable bracket according to claim 1, wherein bracket is made from plastic or paper.

5. The removable/re-usable bracket according to claim 1, further includes a hole in a solid surface wherein said hole is the same diameter or a smaller diameter than said first diameter.

6. The removable/re-usable bracket according to claim 1, wherein said at least one side support is paper, chip board, cardboard or plastic.

7. The removable/re-usable bracket according to claim 1, wherein said at least two extensions lock into said frame.

8. The removable/re-usable bracket according to claim 1, further includes a rib support.

9. The removable/re-usable bracket according to claim 8, wherein said rib support is perpendicular to a top surface or a bottom surface of said frame.

10. The removable/re-usable bracket according to claim 8, wherein said rib support includes a plurality of slots.

11. The removable/re-usable bracket according to claim 1, further includes a second side support wherein said second side support is inserted into said frame in a parallel or perpendicular relationship to said at least a first side support.

12. The removable/re-usable bracket according to claim 1, wherein said at least one side support is flexible.

13. The removable/re-usable bracket according to claim 1, wherein said at least two extensions are on an outside of said circular ring.

14. The removable/re-usable bracket according to claim 1, wherein said at least two extensions exist on said frame in a parallel, perpendicular, or angular relationship to each other.

15. The removable/re-usable bracket according to claim 1, wherein one of said at least two sections is larger.

16. The removable/re-usable bracket according to claim 1, further includes a flat rib that is perpendicular to said flat surface.

17. The removable/re-usable bracket according to claim 16, further includes at least one slot.

18. The removable/re-usable bracket according to claim 17, wherein said at least one slot is configured for securing said bracket to a stud, joist or rafter.

19. The removable/re-usable bracket according to claim 8, wherein said rib extends around said open central area.

* * * * *